E. F. WELZ.
MEAT HOLDER.
APPLICATION FILED APR. 14, 1915.

1,156,510.

Patented Oct. 12, 1915.

WITNESSES:
F. H. Cuno.
L. Rhoades

INVENTOR.
EDWIN F. WELZ.
BY
ATTORNEY.

UNITED STATES PATENT OFFICE.

EDWIN F. WELZ, OF DENVER, COLORADO.

MEAT-HOLDER.

1,156,510.  Specification of Letters Patent.  Patented Oct. 12, 1915.

Application filed April 14, 1915.  Serial No. 21,287.

*To all whom it may concern:*

Be it known that I, EDWIN F. WELZ, a subject of Franz Joseph I, Emperor of Austria-Hungary, having declared my intention to become a citizen of the United States, residing at Denver, in the county of Denver and State of Colorado, have invented certain new and useful Improvements in Meat-Holders, of which the following is a specification.

The invention relates to improvements in meat holders of the type in which an adjustable clamping element is mounted upon a base to firmly hold a piece of meat or a fowl while being sliced.

The primary object of the present invention resides in the method of mounting the meat holding element upon the base so that it may be readily removed or reversed to afford access to opposite sides of a piece of meat. This feature of my invention is of particular value when the meat holder is used in kitchens of clubs, restaurants and other large establishments, inasmuch as it gives the carver ready access to opposite sides of a piece of beef to obtain slices of meat of different degrees of rareness.

Another object of my invention is to provide in connection with the removable and reversible meat holding element, simple, adjustable means for holding its members in their clamping position with relation to a piece of meat after the element has been removed from its base.

By the use of my invention a piece of meat or a fowl after having been cooked, can thus be sliced, stored in a refrigerator or moved from place to place as many times as desired, without coming in contact with the hands.

Figure 1:
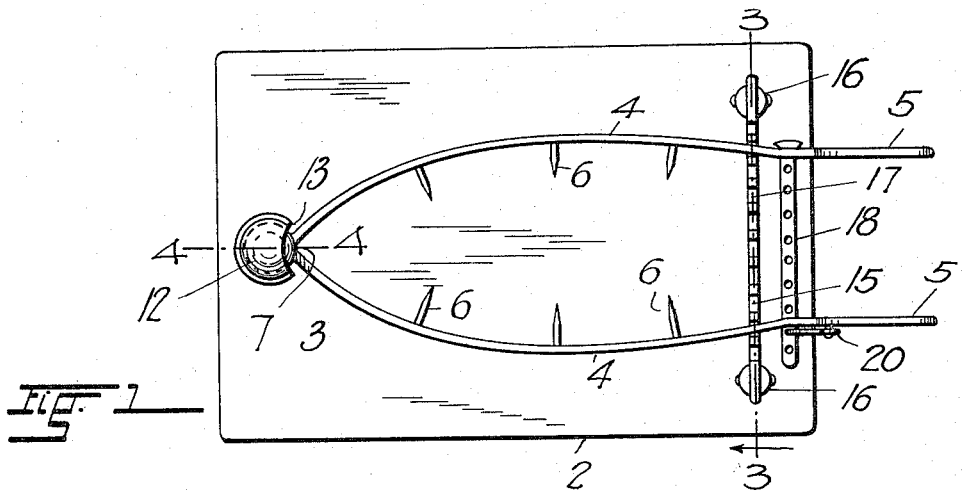
Figure 2:
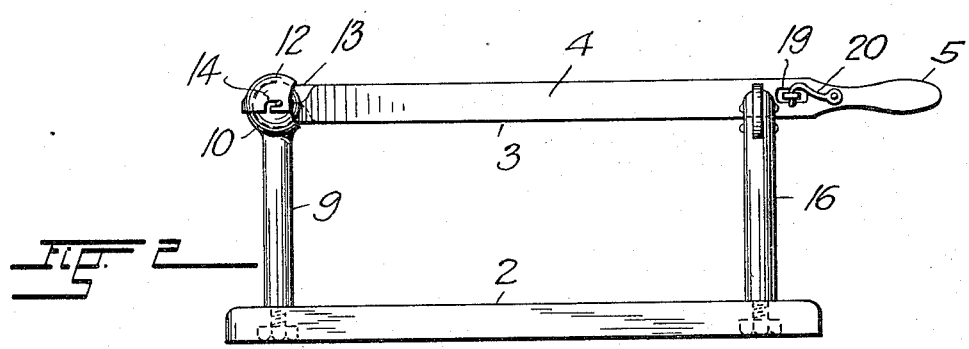
Figure 4:
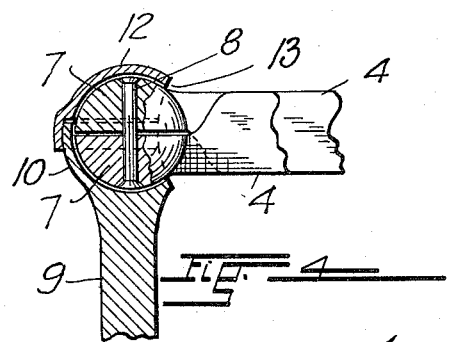
Figure 3:
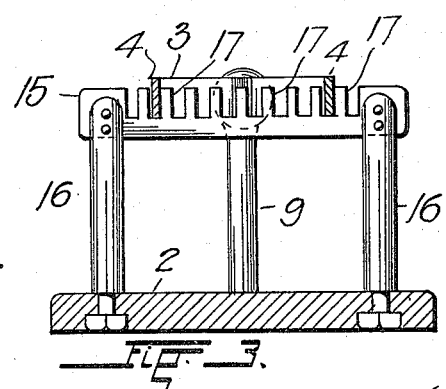
Figure 5:
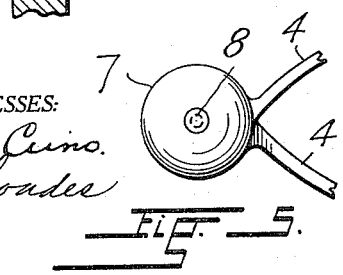

With the above object in view my invention consists in the novel features of construction illustrated in the accompanying drawings in the various views of which like parts are similarly designated, and in which, Figure 1 is a plan view of my improved meat holder, Fig. 2, a side elevation of the same, Fig. 3, a transverse section along the line 3—3, Fig. 1. Fig. 4, an enlarged section taken along the line 4—4, Fig. 1, and Fig. 5, a plan view in detail of the joint by which the members of the meat holding element are articulately connected.

Referring more specifically to the drawings, my improved meat holder comprises a base 2 made of marble, metal or other suitable material, and a meat holding element 3 which is removably and reversibly supported thereon.

The holding element comprises two meat engaging members 3 and 4 which are articulately connected at one of their ends. Handles 5 formed at the free ends of the members, facilitate manipulation of the element, and prongs 6 which project inwardly from the members are in the operation forced into the meat to firmly secure it against independent movement between the members.

The articulate connection between the members is established by two knuckles 7 of semi-spherical shape which are formed integrally at the ends of the members and which are pivotally connected by means of a riveted pin 8 extending loosely through registering central bores. The knuckles when thus joined, form a sphere which in the operation serves to removably and reversibly support the holder upon the base. The latter is to this end provided with a standard 9 which at its upper end carries a cup 10 adapted to receive the lower half of the spherical joint of the holding element.

A cap 12 fitted over the edge of the cup is adapted to loosely inclose the upper portion of the joint and both the cup and its cap are cut away at their forward ends to provide an opening 13 which permits of a limited lateral and up and downward movement of the holding element. The cap may be removably secured upon the cup by suitable means such as the bayonet joint shown at 14 in Fig. 2.

When the holding element is in place on the base, it is supported at the free ends of its members upon a transverse bar 15 which by means of a pair of legs 16 is mounted upon the base at its end opposite to that at which it carries the standard 9. The bar has in its upper edge, a series of equidistant notches 17 into which the members are inserted to hold them against lateral displacement.

The means provided to lock the members of the holding element in their adjustable positions with relation to a piece of meat placed between them, independent of the notched bar 15 on the base, consists of a headed strap 18 which extends through slots 19 in the two members adjacent their handles and which has a series of equidistant holes to receive a latch 20 pivotally attached to one of the handles.

It will be seen from the foregoing description that after a piece of meat is secured between the members of the holding element, its position on the base may be readily reversed by lifting the handles 5 out of the notches on the supporting bar 15 and turning the ball joint in the socket formed by the cup on the standard 9 and the cap 12.

To remove the meat from the base for the purpose of placing it in a refrigerator or of replacing it by another piece of meat or a fowl held in another similar holding element, the two members are secured in their positions relative to the meat by means of the apertured strap 18 and the latch 20, and the cap 12 is removed from the cup. In this connection I desire it understood that the cap is not an essential in the construction of my improved meat holder but may be omitted without any material effect upon the operation.

Having thus described my invention what I claim and desire to secure by Letters-Patent is:

1. In a meat-holder, a holding element comprising two members articulately connected by an exteriorly spherical joint, and a base having supporting means for said element, including an open cup-shaped socket adapted to partially admit said joint, whereby the element may be lifted free from the supporting means or turned to reverse its position with relation to the base.

2. In a meat-holder, a holding element comprising two members articulately connected by an exteriorly spherical joint, and a base having supporting means for said element, including a member capable of locking the element against lateral displacement and an open, cup-shaped socket adapted to partially admit said joint, whereby the element may be lifted free from the supporting means or turned to reverse its position with relation to the base.

In testimony whereof I have affixed my signature in presence of two witnesses.

EDWIN F. WELZ.

Witnesses:
G. J. ROLLANDET,
L. RHOADES.